United States Patent
Lundby et al.

(10) Patent No.: US 8,559,406 B2
(45) Date of Patent: Oct. 15, 2013

(54) METHOD AND APPARATUS FOR COMMUNICATIONS OF DATA IN A COMMUNICATION SYSTEM

(75) Inventors: Stein A. Lundby, Solana Beach, CA (US); Joseph P. Odenwalder, Rancho Santa Fe, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1095 days.

(21) Appl. No.: 10/454,038

(22) Filed: Jun. 3, 2003

(65) Prior Publication Data

US 2004/0246924 A1 Dec. 9, 2004

(51) Int. Cl.
*H04W 4/00* (2009.01)

(52) U.S. Cl.
USPC .......................... 370/338; 370/318; 455/13.4

(58) Field of Classification Search
USPC ......... 370/252, 253, 328, 332, 335, 338, 342, 370/343, 318; 455/13.4, 68, 69, 436
See application file for complete search history.

(56) References Cited

U.S. PATENT DOCUMENTS

| | | | |
|---|---|---|---|
| 5,790,549 A * | 8/1998 | Dent | 370/479 |
| 5,982,758 A * | 11/1999 | Hamdy | 370/331 |
| 6,038,263 A | 3/2000 | Kotzin et al. | |
| 6,157,844 A * | 12/2000 | Doran et al. | 455/552.1 |
| 6,173,005 B1 | 1/2001 | Kotzin et al. | |
| 6,366,779 B1 | 4/2002 | Bender et al. | |
| 6,549,525 B2 | 4/2003 | Odenwalder | |
| 6,754,473 B1 | 6/2004 | Choi et al. | 455/101 |
| 6,907,018 B1 * | 6/2005 | Paranchych et al. | 370/332 |
| 6,937,640 B2 * | 8/2005 | Yun et al. | 375/141 |
| 7,031,741 B2 * | 4/2006 | Lee et al. | 455/522 |
| 7,054,275 B2 | 5/2006 | Kim et al. | |
| 7,155,236 B2 | 12/2006 | Chen et al. | |
| 7,171,165 B2 | 1/2007 | Azman et al. | |
| 7,190,964 B2 | 3/2007 | Damnjanovic et al. | |
| 7,298,773 B2 | 11/2007 | Yun et al. | |

(Continued)

FOREIGN PATENT DOCUMENTS

| | | |
|---|---|---|
| CN | 1377534 A | 10/2002 |
| CN | 1383634 | 12/2002 |

(Continued)

OTHER PUBLICATIONS

Ylitalo, "Channel Estimation Study of CDMA Downlink for Mixed Beam BTS", 2002 IEEE, vol. 1, Sep. 15, 2002, pp. 242-246.

(Continued)

*Primary Examiner* — Kan Yuen
(74) *Attorney, Agent, or Firm* — Jeffrey D. Jacobs; Ramin Mobarhan; Sayed H. Beladi (57) ABSTRACT

A method and apparatus provides for efficient data rate control and power control processes by transmitting a primary and a secondary pilot channel associated with a data channel. The primary and secondary pilot channels are used for decoding the data. A ratio of power levels of the primary and secondary pilot channels is based on at least one of the data rate and payload size of the data channel. The power level of the primary pilot channel is maintained independent of at least one of data rate and payload size of the data channel. The power level of the secondary pilot channel may be adjusted based on at least one of data rate and payload size of the data channel.

13 Claims, 6 Drawing Sheets

(56) References Cited

U.S. PATENT DOCUMENTS

| | | | |
|---|---|---|---|
| 7,299,402 B2 | 11/2007 | Soong et al. | |
| 7,433,339 B2 | 10/2008 | Kaipainen et al. | |
| 7,450,549 B2 | 11/2008 | Qian et al. | |
| 7,486,645 B2 | 2/2009 | Li et al. | |
| 7,660,277 B2 | 2/2010 | Pi et al. | |
| 7,929,481 B2 | 4/2011 | Lundby et al. | |
| 2002/0012385 A1 | 1/2002 | Yun et al. | |
| 2003/0050086 A1 | 3/2003 | Lee et al. | 455/522 |
| 2003/0058831 A1* | 3/2003 | Chen | 370/349 |
| 2004/0160921 A1* | 8/2004 | Kaipainen et al. | 370/335 |
| 2004/0218559 A1 | 11/2004 | Kim et al. | |
| 2005/0147063 A1* | 7/2005 | Pi et al. | 370/335 |
| 2007/0268869 A1 | 11/2007 | Lundby et al. | |

FOREIGN PATENT DOCUMENTS

| | | |
|---|---|---|
| CN | 1407819 A | 4/2003 |
| EP | 1330050 A1 | 7/2003 |
| EP | 1840876 | 10/2007 |
| KR | 2001-0036597 | 5/2001 |
| TW | 459451 B | 10/2001 |
| WO | 9408432 | 4/1994 |
| WO | WO 9819405 * | 5/1998 |
| WO | 0101604 A1 | 1/2001 |
| WO | WO 0101604 * | 4/2001 |
| WO | WO 0199311 A1 | 12/2001 |
| WO | 02054618 | 7/2002 |
| WO | WO 02089358 * | 7/2002 |
| WO | 02089358 | 11/2002 |
| WO | 03009492 | 1/2003 |
| WO | 03009493 | 1/2003 |
| WO | 03017525 | 2/2003 |
| WO | WO 03017525 * | 2/2003 |
| WO | WO2004098097 A1 | 11/2004 |

OTHER PUBLICATIONS

Schacht et al. "Downlink Beamforming Concepts in UTRA FDD", Kleinheubacher Berichte, May 2, 2003, pp. 1-6.

International Search Report—PCT/US04/017163, International Search Authority—European Patent Office, Jun. 27, 2005.
"TIA/EIA/IS-856 CDMA2000 High Rate Packet Data Air Interface Specification," Apr. 4.
Written Opinion—PCT/US04/017163, International Searching Authority—European Patent Office, Jun. 27, 2005.
International Preliminary Report on Patentability—PCT/US04/017163, IPEA/US, Mar. 23, 2006.
Zhigang Rong and Zhouyue Pi, 1xEV-DV Reverse Link Power Control with Fast Rate Controlled R=SCH, 3GPP2 TSG-C Contribution, Dec. 9, 2002.
TIA/EIA/IS-95, Mobile Station-Base Station Compatibility Standard for Dual-Mode Wideband Spread Spectrum Cellular System (Jul. 1993).
European Search Report—EP07110515—Search Authority—Munich—Aug. 25, 2009.
European Search Report—EP10175330—Search Authority—Munich—May 27, 2011.
Partial European Search Report—EP10175330, Search Authority—Munich Patent Office, May 27, 2011.
Qualcomm: "Impact o f Secondary Pilot on E-DPDCH Performance", 3GPP Draft; R1-030429, 3RD Generation Partnership Project (3GPP) , Mobile Competence Centre ; 650, Route Des Lucioles ; F-06921 Sophia-Anti.
Polis Cedex ; France, vol . RAN WG1, No. Paris, France; 20030515, May 15, 2003, XP050097567, [retrieved on May 15, 2003].
Taiwanese Search Report—093115840—TIPO—Feb. 10, 2011.
Younsun Kim, Eddy Kwon, Jin-Kyu Han and Donghee Kim, Pilot Structure for cdma2000 Release D and HRPD Release A, TSG-C WG3,3GPP2, May 12, 2003, URL http://ftp.3gpp2.org/TSGC/working/2003/2003-05-SanDiego/TSG-C-2003-05-San%20Diego/WG3/C30-20030512-071-Samsung%20Pilot%20Structure%20for%20cdma2000%208,%20HRPD.doc.
Wei Y., "Comparison of Power Efficiency between Using R-RICH and R-SPICH as a Secondary Pilot", 3GPP2 Contribution, Apr. 14, 2003, C30-20030414-063.
Luukkanen P., et al., 3GPP2 "1xEV-DV Reverse Link: R-SPICH Peak-to-Average Ratio Simulation Results," Dec. 9, 2002, C3020021209022, <URL, ftp://ftp.3gpp2.org/TSGC../Working/2002/TSG-C-0212/TSG-C-2002-12-Maui/WG3/C30-20021209-022%20NOK%2ORL%20PeakToAverage.pdf>.

* cited by examiner

METHOD AND APPARATUS FOR COMMUNICATIONS OF DATA IN A COMMUNICATION SYSTEM

FIELD

The present invention relates generally to the field of communications, and more particularly, to reverse link communications in a communication system.

BACKGROUND

Figure 7:
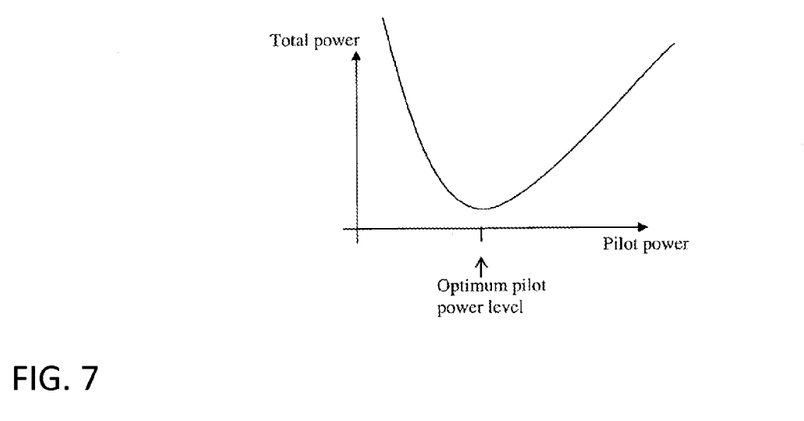
FIG. 7 illustrates the pilot channel optimum power level with respect to the total power level used for transmission of the pilot channel and the data channels.

Reverse link transmissions may require transmission of a pilot signal from the mobile stations to allow for the receiver in the base station to perform coherent multi-path combining and demodulation. Generally, to find an optimum power level for the total transmission power level of the pilot channel and data channels, the power level for the pilot channel is minimized while trying to achieve a decoding error rate performance. For example, in a system commonly known as cdma2000 1x, for the 9600 bit/s format at 1% frame error rate (FER), the optimum pilot channel power level is found experimentally to be about 3.75 dB lower than the data channels power level. If the power level of the pilot channel is increased much above such a defined level, the overall decoding performance does not significantly improve, even though the total transmission power for pilot channel and the data channels is higher. On the other hand, if the pilot channel power level is decreased much below such a defined level, the data channels power level need to be increased to achieve the same decoding error rate performance. In such a case, the total power level for the pilot channel and the data channels is also higher. Therefore, there is an optimum pilot channel power level with respect to a data channel power level for a communication data rate at a decoding error rate performance level. The graph shown in FIG. 7 may illustrate the pilot channel optimum power level with respect to the total power level used for transmission of the pilot channel and the data channels. The optimum pilot power level may be different for different data rates. Higher data rate transmissions have an optimum pilot level that may be much higher than the pilot level required for low data rates. The difference in optimal pilot levels for low and high data rates may be about 13 dB.

The pilot channel power level is also measured by the receiver in a power control process for controlling the transmission power level. Typically, the receiver measures the signal to noise ratio (SNR) of the pilot channel. The measured SNR is compared to a threshold. If the measured SNR is higher than the threshold, the receiver through its accompanying transmitter instructs the transmitting source to lower the pilot channel power. The data channel power level is also lowered to maintain a pilot channel to data channel power level ratio. If the measured SNR is lower than the threshold, the receiver through its accompanying transmitter instructs the transmitting source to increase the pilot channel power. The data channel power level is also increased to maintain a pilot channel to data channel power level ratio. As such, the receiving end through the power control process attempts to maintain a pilot SNR at the receiver for proper decoding process at a minimal error rate.

The communication system also has a data rate control process that attempts to maximize the transmission data rate for optimum data throughput. Based on measured channel characteristics, the data rate may be increased or lowered. In another aspect, the data rate may change based on the demand, considering that the channel characteristics allow for proper communications at the requested data rate.

In such a communication system, the pilot channel power control and the data rate control may operate independently. As such, when the data rate is changed, the power level of the pilot channel may also change, without the power control process involvement, to maintain the optimum pilot channel power level. Since the power control process has no knowledge of the data rate change and the corresponding pilot channel power change, the power control process may take the change in the pilot channel power as a change in the channel propagation. Such a detection normally initiates a process for changing the pilot channel power through the power control process. Therefore, if the change in the pilot channel power level to satisfy a different data rate transmission is without notifying the receiving end in advance, the power control process may erroneously instruct for the pilot channel to rectify its transmit power.

Therefore, there is a need for power control process and data rate control process to operate simultaneously in a communication system without any adverse effect.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENT(S)

A method and apparatus provides for efficient data rate control and power control processes by transmitting a primary and a secondary pilot channel associated with a data channel. The primary and secondary pilot channels are used for decoding the data. A ratio of power levels of the primary and secondary pilot channels is based on at least one of the data rate and payload size of the data channel. The power level of the primary pilot channel is maintained independent of at least one of data rate and payload size of the data channel. The power level of the secondary pilot channel may be adjusted based on at least one of data rate and payload size of the data channel. One or more exemplary embodiments described herein are set forth in the context of a digital wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps.

More specifically, various embodiments of the invention may be incorporated in a wireless communication system operating in accordance with the code division multiple access (CDMA) technique which has been disclosed and described in various standards published by the Telecommunication Industry Association (TIA) and other standards organizations. Such standards include the TIA/EIA-95 standard, TIA/EIA-IS-2000 standard, IMT-2000 standard, UMTS and WCDMA standard, all incorporated by reference herein. A system for communication of data is also detailed in the "TIA/EIA/IS-856 cdma2000 High Rate Packet Data Air Interface Specification," incorporated by reference herein. A copy of the standards may be obtained by accessing the world wide web at the address: http://www.3gpp2.org, or by writing to TIA, Standards and Technology Department, 2500 Wilson Boulevard, Arlington, Va. 22201, United States of America. The standard generally identified as UMTS standard, incorporated by reference herein, may be obtained by contacting 3GPP Support Office, 650 Route des Lucioles-Sophia Antipolis, Valbonne-France.

Figure 1:
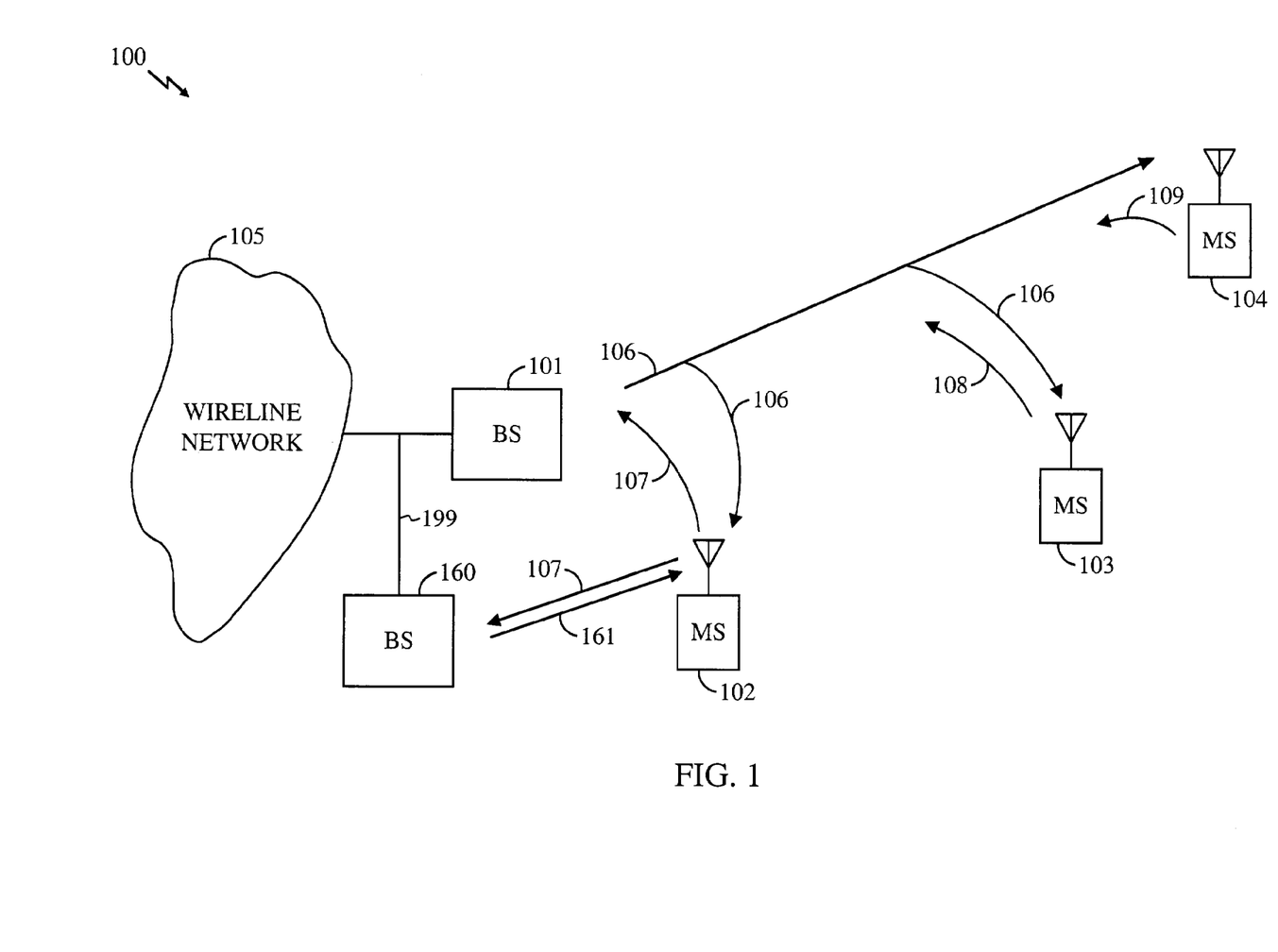
FIG. 1 depicts a communication system for transmitting and receiving data in accordance with various aspects of the invention.

FIG. 1 illustrates a general block diagram of a communication system 100 capable of operating in accordance with any of the code division multiple access (CDMA) communication system standards while incorporating various embodiments of the invention. Communication system 100 may be for communications of voice, data or both. Generally, communication system 100 includes a base station 101 that provides communication links between a number of mobile stations, such as mobile stations 102-104, and between the mobile stations 102-104 and a public switch telephone and data network 105. The mobile stations in FIG. 1 may be referred to as data access terminals (AT) and the base station as a data access network (AN) without departing from the main scope and various advantages of the invention. Base station 101 may include a number of components, such as a base station controller and a base transceiver system. For simplicity, such components are not shown. Base station 101 may be in communication with other base stations, for example base station 160. A mobile switching center (not shown) may control various operating aspects of the communication system 100 and in relation to a back-haul 199 between network 105 and base stations 101 and 160.

Base station 101 communicates with each mobile station that is in its coverage area via a forward link signal transmitted from base station 101. The forward link signals targeted for mobile stations 102-104 may be summed to form a forward link signal 106. The forward link may carry a number of different forward link channels. Each of the mobile stations 102-104 receiving forward link signal 106 decodes the forward link signal 106 to extract the information that is targeted for its user. Base station 160 may also communicate with the mobile stations that are in its coverage area via a forward link signal transmitted from base station 160. Mobile stations 102-104 may communicate with base stations 101 and 160 via corresponding reverse links. Each reverse link is maintained by a reverse link signal, such as reverse link signals 107-109 for respectively mobile stations 102-104. The reverse link signals 107-109, although may be targeted for one base station, may be received at other base stations.

Base stations 101 and 160 may be simultaneously communicating to a common mobile station. For example, mobile station 102 may be in close proximity of base stations 101 and 160, which can maintain communications with both base stations 101 and 160. On the forward link, base station 101 transmits on forward link signal 106, and base station 160' on the forward link signal 161. On the reverse link, mobile station 102 transmits on reverse link signal 107 to be received by both base stations 101 and 160. For transmitting a packet of data to mobile station 102, one of the base stations 101 and 160 may be selected to transmit the packet of data to mobile station 102. On the reverse link, both base stations 101 and 160 may attempt to decode the traffic data transmission from the mobile station 102. The data rate and power level of the reverse and forward links may be maintained in accordance with the channel condition between the base station and the mobile station in accordance with various aspects of the invention.

Figure 2:
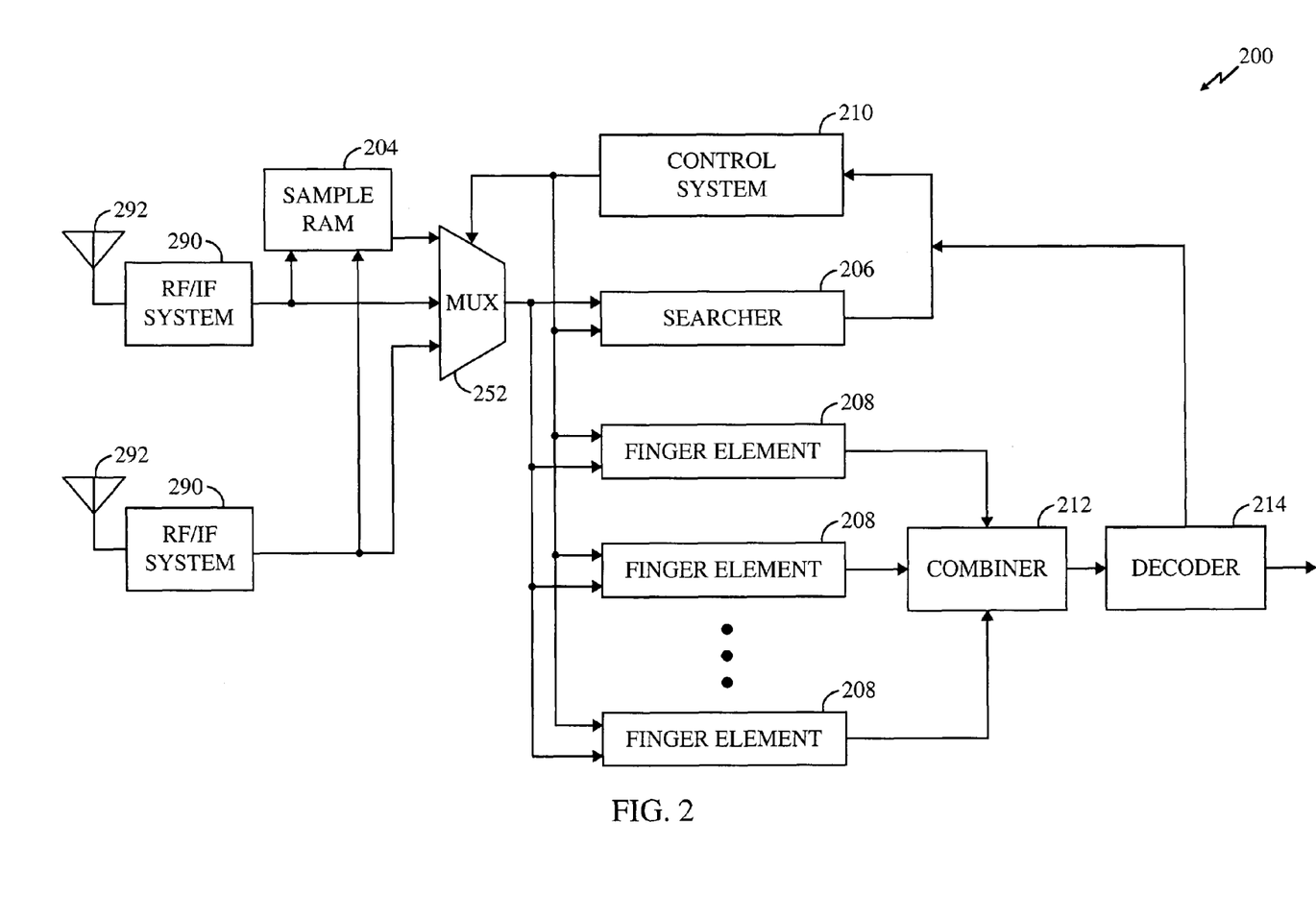
FIG. 2 depicts a receiver system for receiving data in accordance with various aspects of the invention.

FIG. 2 illustrates a block diagram of a receiver 200 used for processing and demodulating the received CDMA signal while operating in accordance with various aspects of the invention. Receiver 200 may be used for decoding the information on the reverse and forward links signals. Receiver 200 may be used for demodulating the pilot channel and decoding information on the data channels such as the fundamental channel, control channel and supplemental channels. Received (Rx) samples may be stored in RAM 204. Receive samples are generated by a radio frequency/intermediate frequency (RF/IF) system 290 and an antenna system 292. The RF/IF system 290 and antenna system 292 may include one or more components for receiving multiple signals and RF/IF processing of the received signals for taking advantage of the receive diversity gain. Multiple received signals propagated through different propagation paths may be from a common source. Antenna system 292 receives the RF signals, and passes the RF signals to RF/IF system 290. RF/IF system 290 may be any conventional RF/IF receiver. The received RF signals are filtered, down-converted and digitized to form RX samples at base band frequencies. The samples are supplied to a multiplexer (mux) 252. The output of mux 252 is supplied to a searcher unit 206 and finger elements 208. A control system 210 is coupled thereto. A combiner 212 couples a decoder 214 to finger elements 208. Control system 210 may be a microprocessor controlled by software, and may be located on the same integrated circuit or on a separate integrated circuit. The decoding function in decoder 214 may be in accordance with a turbo decoder or any other suitable decoding algorithms. The signal transmitted from a source may be encoded with several layers of codes. As such, the decoder 214 decodes the received samples in accordance with such codes.

During operation, received samples are supplied to mux 252. Mux 252 supplies the samples to searcher unit 206 and finger elements 208. Control unit 210 configures finger elements 208 to perform demodulation and despreading of the received signal at different time offsets based on search results from searcher unit 206. The results of the demodulation are combined and passed to decoder 214. Decoder 214 decodes the data and outputs the decoded data. Despreading of the channels is performed by multiplying the received samples with the complex conjugate of the PN sequence and assigned Walsh function at a single timing hypothesis and digitally filtering the resulting samples, often with an integrate and dump accumulator circuit (not shown). Such a technique is commonly known in the art. Receiver 200 may be used in a receiver portion of base stations 101 and 160 for processing the received reverse link signals from the mobile stations, and in a receiver portion of any of the mobile stations for processing the received forward link signals.

The decoder 214 may accumulate the combined energy for detection of a data symbol. Each packet of data may carry a cyclic redundancy check (CRC) field. The decoder 214 may in connection with control system 210 and or other control systems check for error in the received data packet. If the CRC data does not pass, the received packet of data has been received in error. The control system 210 and or other control systems may send a negative acknowledgment message to the transmitter to retransmit the packet of data.

Figure 3:
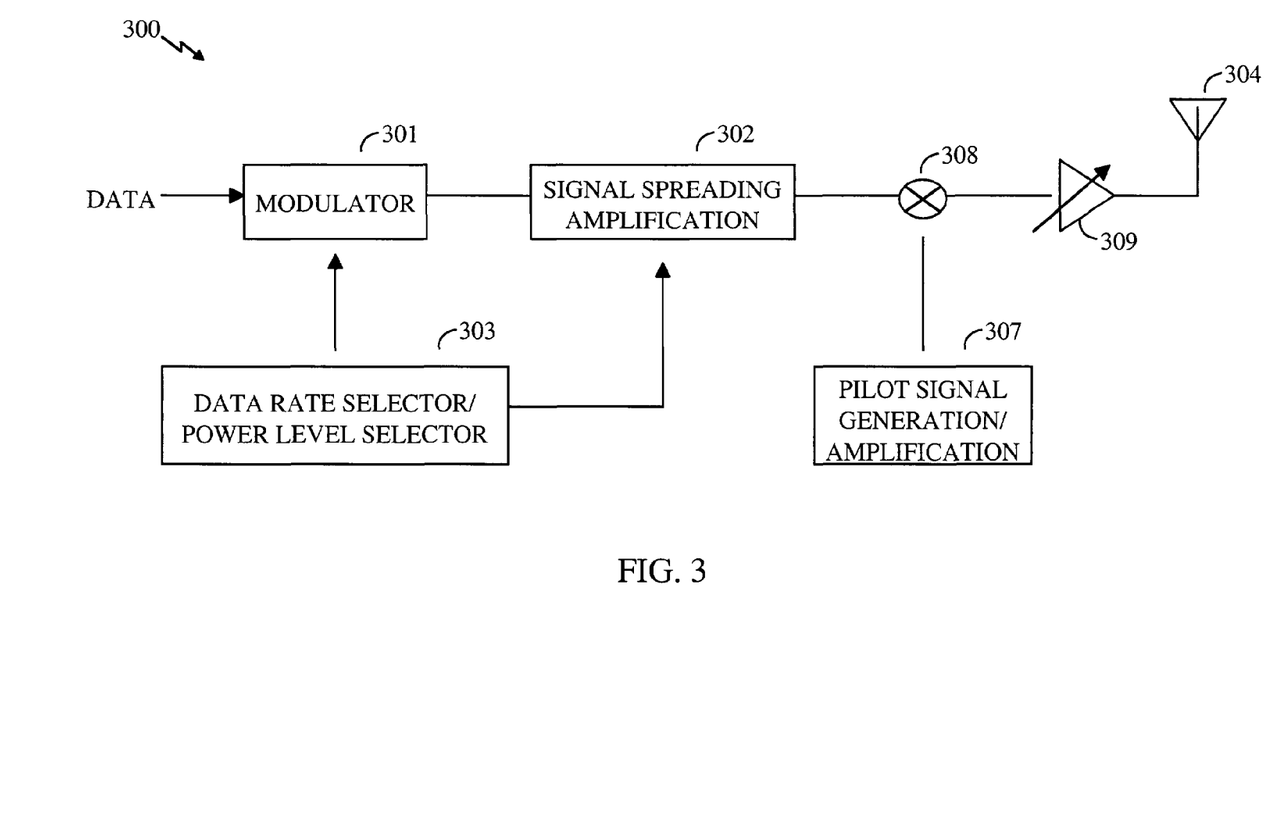
FIG. 3 depicts a transmitter system for transmitting data in accordance with various aspects of the invention.

FIG. 3 illustrates a block diagram of a transmitter 300 for transmitting the reverse and forward link signals. The channel data for transmission are input to a modulator 301 for modulation. The modulation may be according to any of the commonly known modulation techniques such as QAM, PSK or BPSK. Before modulation, the channel data for transmission may pass through one or more layers of coding. The channel data for transmission are produced for modulator 301. The channel data for transmission are received by the modulator 301.

The modulation data rate may be selected by a data rate and power level selector 303. The data rate selection may be based on feedback information received from a destination. The data rate very often is based, on the channel condition, among other considered factors. The channel condition may change from time to time. The data rate selection may also change from time to time.

The data rate and power level selector 303 accordingly selects the data rate in modulator 301. The output of modulator 301 passes through a signal spreading operation and amplified in a block 302 for transmission from an antenna 304. The data rate and power level selector 303 also selects a power level for the amplification level of the transmitted signal. The combination of the selected data rate and the power level allows proper decoding of the transmitted data at the receiving destination. A pilot signal is also generated in a block 307. The pilot signal is amplified to an appropriate level in block 307. The pilot signal power level may be in accordance with the channel condition at the receiving destination. The pilot signal may be combined with the channel signal in a combiner 308. The combined signal may be amplified in an amplifier 309 and transmitted from antenna 304. The antenna 304 may be in any number of combinations including antenna arrays and multiple input multiple output configurations.

Figure 4:
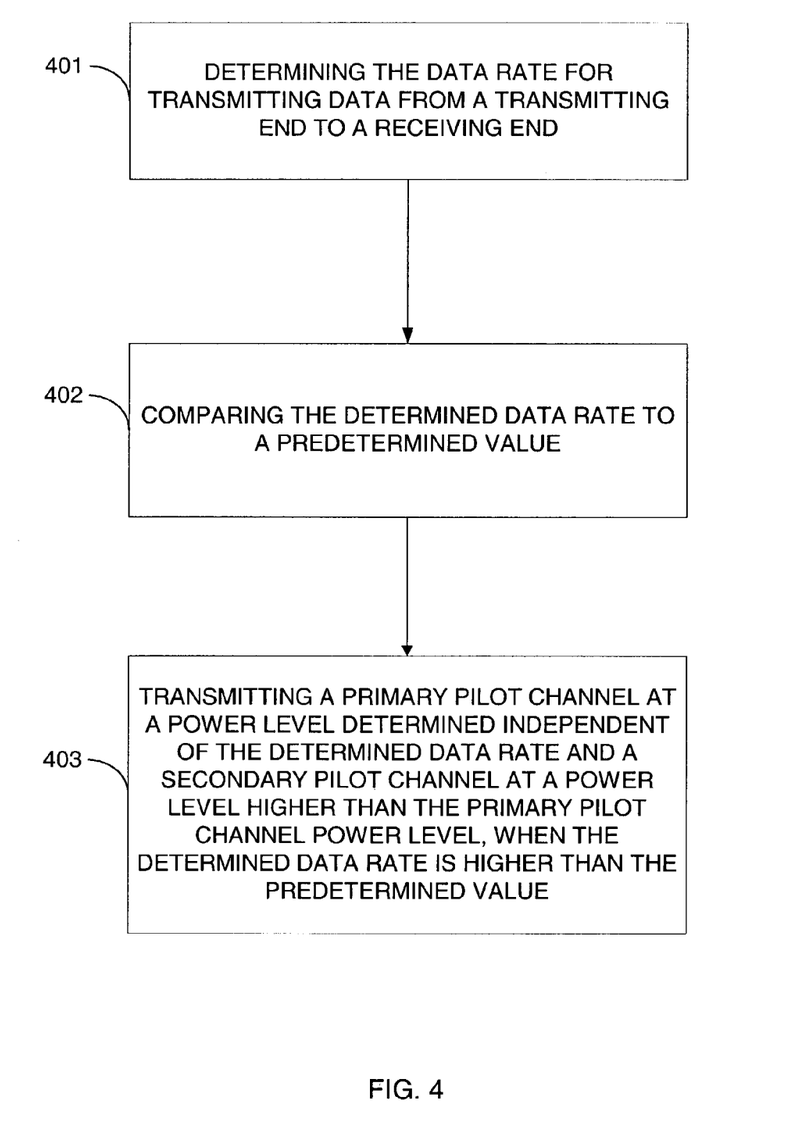
FIG. 4 depicts a flow diagram of one or more step at a transmitting end in accordance with various aspects of the invention.

Referring to FIG. 4, a flow diagram 400 depicts one or more step at a transmitting end in accordance with various aspects of the invention. The transmitting end, in case of reverse link in communication system 100, may be the mobile stations, and the transmitter may be the transmitter 300. In accordance with various aspects of the invention, the problem with contention of data rate and power control processes is resolved by transmission and use of multiple (more than one) pilot channels. The mobile stations transmit more than one pilot channel associated with a reverse link. In one embodiment, the mobile stations transmit two pilot channels associated with transmission of a data channel. At step 401, the mobile station determines the data rate of the data channel for transmission to a receiving end such as the base station 101 or 160. The data rate may be determined based on commonly known processes. Such processes include determining the data rate based on the propagation channel characteristics or a requested data rate. The transmission data rates may range from a low value to a high value. The standard defining the operating requirements of communication system 100 may define the range. At step 402, the determined data rate is compared to a predetermined value. For example, the predetermined value may be a data rate between 38,400 bits/sec and 115,200 bits/sec. At step 403, if the determined data rate is higher than the predetermined value, the mobile station transmits a primary pilot channel and a secondary pilot channel in accordance with various aspects of the invention. The power level of the primary pilot channel is determined independent of the determined data rate. The power level of the primary pilot channel is generally determined in accordance with the power control process; however, in accordance with an embodiment, the power level does not change with respect to the determined data rate. The secondary pilot channel is transmitted at a power level higher than the primary pilot channel power level in accordance with various aspects of the invention. The power level of the secondary pilot channel may be 19 times higher than the primary pilot channel power level.

Generally, the system may allow for transmissions of data at a number of different data rates. The number of data rates below the predetermined value may be more than one. The number of data rates above the predetermined value may also be more than one. In one exemplary embodiment, the rates above the predetermined value are 115,200 bits/s, 230,400 bits/s, and 307,200 bits/s, while the rates below the predetermined value are 9,600 bits/s, 19,200 bits/s, and 38,400 bits/s.

The data rates values may be replaced by payload size values, or any other parameter that its value indicates a relationship in at least one aspect to the data rate of data transmission. Therefore, the predetermined value relates to such values of such parameters. In one exemplary embodiment the system may use hybrid automatic re-transmission (HARQ). In such a case, the data rates may not be clearly defined since the data rate depends on the number of frame transmissions the data packet may require for completing the transmission from a transmitting end and proper reception at a receiving end. In such a system, the predetermined value may be a payload size of a frame or a time slot. The payload sizes may include 192, 384, 768, 1536, 3072, 4608, and 6144 bits. Payload sizes 192, 384, 768, and 1536 bits may be below the predetermined value. Therefore, any transmission of data at such payload sizes is transmitted without a secondary pilot. The payload sizes 3072, 4608, and 6144 bits may be above the predetermined value. Therefore, any transmission of data at such payload sizes is transmitted with a secondary pilot.

In accordance with various aspects of the invention, the power level of the primary pilot channel does not change with data rate. Accordingly, even though for data rates below the predetermined value when the secondary pilot channel is not transmitted, the primary pilot channel power level is independent of the communication data rates. In accordance with various aspects of the invention, the power levels of the primary and secondary pilot channels for data rates above the predetermined value remain independent of the data rates. The power levels of the primary and secondary pilot channels, in one embodiment, remain at the same ratio for all data rates above the predetermined value.

Figure 5:
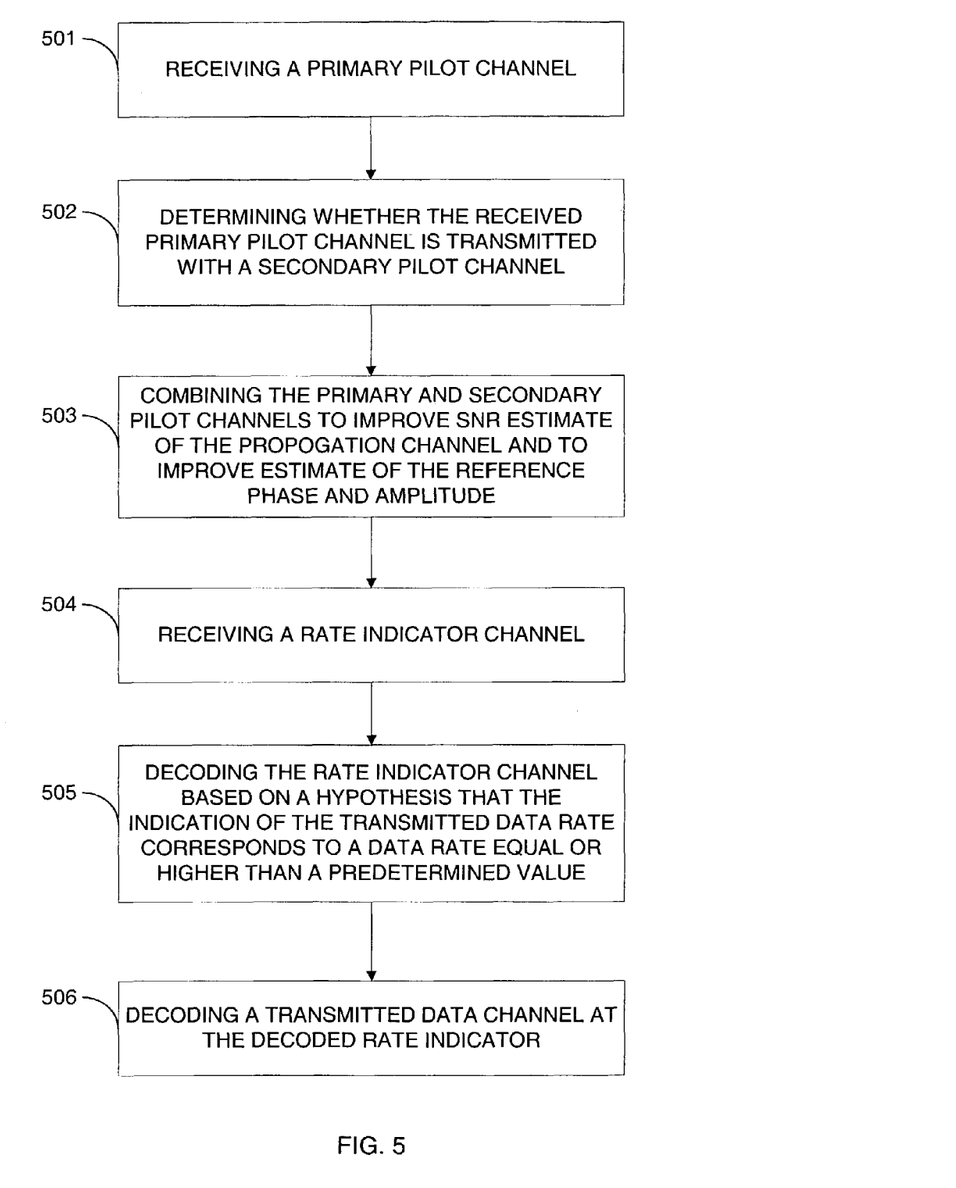
FIG. 5 depicts a flow diagram of one or more step at a receiving end in accordance with various aspects of the invention.

Referring to FIG. 5, a process flow 500 for receiving and decoding a data channel is outlined in accordance with various aspects of the invention. At step 501, the receiver may receive a primary pilot channel. The receiver may be a base station in the communication system 100. The receiver may be the receiver 200 shown in FIG. 2. At step 502, the receiver determines whether the received primary, pilot channel is transmitted with a secondary pilot channel. Such a detection may be performed by searching for an energy level of the secondary pilot channel above an energy threshold, or above the energy level of the primary pilot channel. Since the secondary pilot channel is transmitted at a much higher level, the detection of such an energy level may easily be accomplished by the receiver 200 very quickly, e.g. one slot of 1.25 ms. If the secondary pilot channel is detected, at step 503, the receiver 200 may combine the primary and secondary pilot channels to improve the phase and amplitude estimate for multi-path combining of the other channels such as the data channels in receiver structure 200. Those skilled in the art appreciate that the improved phase and amplitude reference also aids other types of receivers such as equalizers. Those skilled in the art may further appreciate that the ability to rapidly detect the presence of the secondary pilot and its level relative to the primary pilot is of a great benefit for implementation, since it directly reduces the amount of memory necessary in the receiver for buffering the signal before multi-path combining. In receiver 200, such additional memory requirement would have increased the size of sample RAM 204 or added into the front of each finger element 208, and thus increasing their complexity.

When the primary pilot is transmitted without the secondary pilot channel, the SNR estimation for power control may be based on the primary pilot channel received signal. When the primary pilot is transmitted with the secondary pilot channel, the SNR estimation may be based on the secondary pilot channel received signal since the secondary pilot channel may be transmitted at higher signal level than the primary channel. The combination of the primary and secondary pilot channels determined at step 503 may also be used to generate a more accurate SNR estimate of the propagation channel for power control. The SNR values of the primary and secondary pilot channels may be combined in accordance with a weighted combining process. For example, more weight is accorded the SNR value of the secondary pilot channel than the primary pilot channel since the secondary pilot channel may be transmitted at higher signal level than the primary channel.

The performance of the power control process is also improved based on an improved SNR determined at step 503. An inaccurate SNR estimate degrades the power control performance by leading inaccuracy in controlling the receiver power to the desired value. For power control process, the improved estimate of the SNR value is compared to a power control threshold. If the SNR is higher than the threshold, the receiving end instructs the transmitting to lower the transmission power level. If the SNR is lower than the threshold, the receiving end instructs the transmitting to increase the transmission power level. In accordance with various aspects of the invention, the power control process at the transmitting end adjusts the primary pilot channel power level in response to the power control command. The secondary pilot channel power level is based in accordance with various aspects of the invention on a predetermined ratio with respect to the primary pilot channel power level. Therefore, when the primary pilot channel power level changes in response to the power control command, the secondary pilot channel power level also changes correspondingly; however, the power level ratio remains the same.

A delayed SNR estimate may also degrade the power control process when the channel is varying over time. Typically, the delay in estimating the SNR for power control is 1 time slot. Since the time necessary to detect the presence of a secondary pilot may also be one time slot, the primary and secondary pilots may be combined without significantly increasing the latency in the SNR estimation. The power control therefore still functions well when the channel is varying over time.

The transmitting end may also have sent a rate indicator channel (RICH) along with transmission of data on the data channel. The receiving end at step 504 receives the RICH. The RICH is used to assists the receiving end to determine the data rate of data channel. The determined data rate is used in the decoding process of the data channel. As such, in order to correctly and accurately decode the data channel, the information obtained from the RICH needs to be accurate. Generally, for decoding the RICH, the receiver makes several hypotheses about the received data on the RICH. At the end, the receiver picks one of the hypotheses with the highest confidence level. Since the receiver needs to examine several hypotheses, detection of the secondary pilot channel may help the receiver decode the RICH. As such, at step 505, the receiver decodes the RICH based on at least a hypothesis that the indication of the transmitted data rate corresponds to a data rate higher than the predetermined value used in the transmitter to trigger transmission of the secondary pilot channel. In one aspect, the receiver may ignore any outcome of the RICH decoding process that corresponds to data rate lower than the predetermined data rate. Similarly, if the secondary pilot is not detected, the data rate is most likely below the predetermined value that is used to trigger transmission of the secondary pilot channel. At the step 506, the receiver decodes the data channel based on the decoded RICH. The decoding process may involve multi-path combining and demodulation processes. The estimate of the improved phase and amplitude reference determined at step 503 may be used for the decoding process at step 506.

In other aspects, the RICH may be required to carry less information if the transmission of the secondary pilot channel is used in accordance with various aspects of the invention. When less information needs to be transmitted, the performance of the decoding process may be improved. For example, instead of the RICH allowing 32 possible inputs for the four sub-packet identifiers and eight possible encoder packet sizes or allowing 33 possible inputs with an additional zero-rate indicator input, the transmission and detection of the secondary pilot channel may be used to reduce the amount of data indicating the number of encoder packet sizes that is possibly transmitted. The rate indicator process through the RICH may reduce the number of possible inputs to 16 (or 17 with a zero-rate indicator) by using a secondary pilot channel detection to specify which of the four largest of eight encoder packet sizes is used and the lack of a secondary pilot detection to specify which of the smallest four encoder packet sizes is used. In one exemplary embodiment, the encoder packet sizes may be 192 bits, and 384 bits. The sub-packet identifiers may be '0', and '1'. The RICH may therefore contain any of 4 code-words corresponding to an encoder packet size and a sub-packet identifier. The RICH code-words may be "00", "01", "10", and "11". If the presence of the secondary pilot is used to deduce the payload size, then the RICH may use only 2 code-words, for example "00", and "01".

In another embodiment, the power level of the secondary pilot channel may be selected to be higher than the primary pilot channel in accordance with a number of predefined ratios. For example, if the data rate of the data channel is above a first predetermined value but below a second predetermined value, the power level of the secondary pilot channel is higher than the primary pilot channel in accordance with a first defined ratio. Furthermore, if the data rate of the data channel is above the second predetermined value, the power level of the secondary pilot channel is higher than the primary pilot channel in accordance with a second defined ratio. On the receiving end, after detecting the primary pilot channel, the power level of the secondary pilot channel may determine the range of the expected values of decoding the RICH. If the received power level ratio of the primary and secondary pilot channels corresponds to the first ratio, the expected value of decoding RICH would be between the first and second predetermined values. If the received power level ratio of the primary and secondary pilot channels corresponds to the second ratio, the expected value of decoding RICH would be above the second predetermined value.

Figure 8:
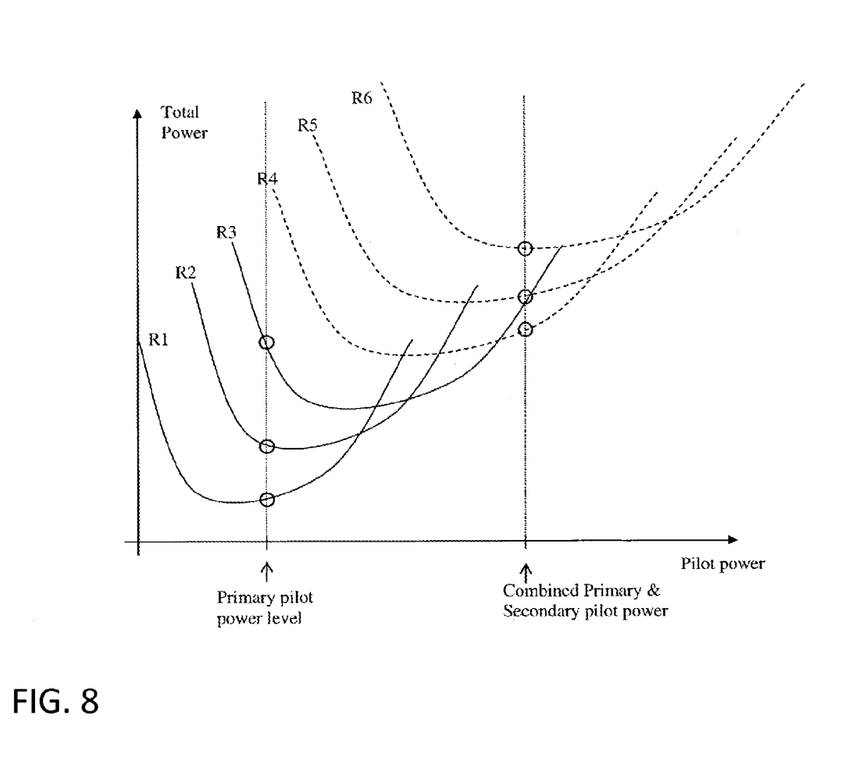
FIG. 8 illustrates selection of optimum total pilot channels power level in accordance with various aspects of the invention.

The selection of optimum total pilot channels power level may be described by the graph shown in FIG. 8. As shown in FIG. 8, for data rates R4, R5 and R6, the combined primary and secondary pilot channels power level is selected such that the total power level corresponds to an optimum power level nearly suitable for R4, R5 and R6 data rates. For data rates R1, R2 and R3, the pilot power level consists of the power level of the primary pilot channel. Similarly, the total pilot power is selected such that the power level is nearly suitable for data rates R1, R2 and R3. The predetermined value that establishes whether to transmit a secondary pilot channel is based between R3 and R4 values. As such, the pilot channel power level is selected near an optimum level while allowing the data rate control and power control processes to operate together without any contention between the needs to transmit a higher pilot power level for high data rates and power control based on the received pilot channel SNR.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for communications of data, comprising:
    transmitting a primary pilot channel associated with a data channel on a reverse link, a primary pilot channel power being independent of a data channel rate, and the primary pilot channel being used for decoding the data channel;
    depending on channel conditions of the data channel, determining whether the primary pilot channel is insufficient;
    if the primary pilot channel is insufficient, transmitting a secondary pilot channel associated with said data channel on said reverse link, the secondary pilot channel being used solely for decoding the data channel;
    transmitting data on said data channel;
    determining at least one of data rate of said transmitting data on said data channel and payload size of said transmitting data on said data channel; and
    determining a ratio of power levels of said primary and secondary pilot channels based on at least one of said determined data rate and payload size.

2. The method as recited in claim 1, wherein the primary pilot channel and the secondary pilot channel have a predetermined ratio independent of the data channel.

3. The method as recited in claim 1 further comprising: maintaining power level of said primary pilot channel independent of at least one of data rate and payload size of said transmitting data on said data channel; and
    maintaining power level of said secondary pilot channel higher than the primary pilot channel and independent of the data channel, the secondary pilot channel and the primary pilot channel having a predetermined ratio independent of the data channel.

4. The method as recited in claim 1, further comprising: adjusting power level of said secondary pilot channel based on at least one of data rate and payload size of said data channel.

5. A method for a communication system, comprising:
    receiving a primary pilot channel, a secondary pilot channel, and a data channel on a reverse link, wherein said primary and secondary pilot channels are associated with said data channel and power levels of the primary pilot channel and the secondary pilot channel are based on the data channel;
    decoding said received data channel based on channel information determined from said received primary and secondary pilot channels; and
    decoding a rate indicator channel, the rate indicator channel indicating at least one of a payload size and data rate of said data channel, the rate indicator channel being received from a transmitting end wherein the transmitting end transmits said primary pilot channel, secondary pilot channel and data channel, the decoding of the rate indicator channel based on at least one of received power level of said secondary pilot channel and a ratio of received power levels of said primary and secondary pilot channels.

6. The method as recited in claim 5 further comprising: utilizing received signal to noise ratio of said secondary pilot channel for a power control process between a receiving end and a transmitting end respectively receiving and transmitting said primary pilot channel, secondary pilot channel and data channel.

7. An apparatus comprising:
a receiver for receiving a primary and secondary pilot channels and a data channel on a reverse link, wherein said primary and secondary pilot channels are associated with said data channel and power levels of the primary pilot channel and the secondary pilot channel are based on the data channel;
a decoder for decoding said data on said received data channel based on channel information determined from said received primary and secondary pilot channels; and
wherein said decoder is further configured for:
decoding a rate indicator channel, the rate indicator channel indicating at least one of a payload size and data rate of said data channel, the rate indicator channel being received from a transmitting end wherein the transmitting end transmits said primary pilot channel, secondary pilot channel and data channel, the decoding of the rate indicator channel based on at least one of received power level of said secondary pilot channel and a ratio of received power levels of said primary and secondary pilot channels.

8. The apparatus as recited in claim 7 further comprising: a power control processor configured for utilizing received signal to noise ratio of said secondary pilot channel for a power control process between a receiving end and a transmitting end, respectively receiving and transmitting said primary pilot channel, secondary pilot channel and data channel.

9. A non-transitory computer-readable media including computer-executable instructions for performing a method for a communication system, the method comprising:
receiving a primary pilot channel, a secondary pilot channel and a data channel on a reverse link, wherein said primary and secondary pilot channels are associated with said data channel and power levels of the primary pilot channel and the secondary pilot channel are based on the data channel; and
decoding said received data channel based on channel information determined from said received primary and secondary pilot channels; and
decoding a rate indicator channel, the rate indicator channel indicating at least one of a payload size and data rate of said data channel, the rate indicator channel being received from a transmitting end wherein the transmitting end transmits said primary pilot channel, secondary pilot channel and data channel, the decoding of the rate indicator channel based on at least one of received power level of said secondary pilot channel and a ratio of received power levels of said primary and secondary pilot channels.

10. A method for a communication system, comprising:
receiving a primary pilot channel and a data channel on a reverse link, wherein said primary pilot channel is associated with said data channel;
determining whether a secondary pilot channel associated with the data channel is transmitted by searching for an energy level of the secondary pilot channel above energy level of the primary pilot channel;
combining the primary pilot channel and the secondary pilot channel to determine an estimate of propagation channel associated with the data channel; and
decoding said received data channel based on the estimate of the propagation channel determined from said received primary and secondary pilot channels.

11. A method for a communication system, comprising:
receiving a primary pilot channel, selectively a secondary pilot channel, and a data channel on a reverse link, wherein said primary and secondary pilot channels are associated with said data channel and power levels of the primary pilot channel and the secondary pilot channel are based on the data channel;
decoding said received data channel based on channel information determined from said received primary and secondary pilot channels; and
decoding a rate indicator channel, the rate indicator channel indicating at least one of a payload size and data rate of said data channel, the rate indicator channel being received from a transmitting end wherein the transmitting end transmits said primary pilot channel, secondary pilot channel and data channel, the decoding of the rate indicator channel based on at least one of received power level of said secondary pilot channel and a ratio of received power levels of said primary and secondary pilot channels.

12. An apparatus comprising:
a receiver for receiving a primary and selectively secondary pilot channels and a data channel on a reverse link, wherein said primary and secondary pilot channels are associated with said data channel and power levels of the primary pilot channel and the secondary pilot channel are based on the data channel;
a decoder for decoding said data on said received data channel based on channel information determined from said received primary and secondary pilot channels; and
wherein said decoder is further configured for:
decoding a rate indicator channel, the rate indicator channel indicating at least one of a payload size and data rate of said data channel, the rate indicator channel being received from a transmitting end wherein the transmitting end transmits said primary pilot channel, secondary pilot channel and data channel, the decoding of the rate indicator channel based on at least one of received power level of said secondary pilot channel and a ratio of received power levels of said primary and secondary pilot channels.

13. A non-transitory computer-readable media including computer-executable instructions for performing a method for a communication system, the method comprising:
receiving a primary pilot channel, selectively a secondary pilot channel and a data channel on a reverse link, wherein said primary and secondary pilot channels are associated with said data channel and power levels of the primary pilot channel and the secondary pilot channel are based on the data channel;
decoding said received data channel based on channel information determined from said received primary and secondary pilot channels; and
decoding a rate indicator channel, the rate indicator channel indicating at least one of a payload size and data rate of said data channel, the rate indicator channel being received from a transmitting end wherein the transmitting end transmits said primary pilot channel, secondary pilot channel and data channel, the decoding of the rate indicator channel based on at least one of received power level of said secondary pilot channel and a ratio of received power levels of said primary and secondary pilot channels.

\* \* \* \* \*